US 6,657,630 B1

(12) United States Patent
Kurosawa et al.

(10) Patent No.: US 6,657,630 B1
(45) Date of Patent: Dec. 2, 2003

(54) IMAGE GENERATING DEVICE AND IMAGE GENERATING METHOD

(75) Inventors: Masahito Kurosawa, Tokyo (JP); Hajime Sugiyama, Hiratsuka (JP)

(73) Assignee: Kabushiki Kaisha Sega Enterprises, Tokyo (JP)

( * ) Notice: Subject to any disclaimer, the term of this patent is extended or adjusted under 35 U.S.C. 154(b) by 0 days.

(21) Appl. No.: 09/341,189

(22) PCT Filed: Nov. 6, 1998

(86) PCT No.: PCT/JP98/05015
§ 371 (c)(1),
(2), (4) Date: Oct. 19, 1999

(87) PCT Pub. No.: WO99/24937
PCT Pub. Date: May 20, 1999

(30) Foreign Application Priority Data

Nov. 7, 1998 (JP) ............................................. 9-306226

(51) Int. Cl.[7] .............................................. G06T 15/00
(52) U.S. Cl. ...................................................... 345/475
(58) Field of Search .................................. 345/473, 474, 345/475, 619, 629, 630

(56) References Cited

U.S. PATENT DOCUMENTS

| | | | | |
|---|---|---|---|---|
| 4,148,485 A | | 4/1979 | Rains ........................... 273/86 |
| 4,645,459 A | * | 2/1987 | Graf et al. ..................... 434/43 |
| 4,895,376 A | * | 1/1990 | Chiang Shiung-Fei ...... 273/313 |
| 5,755,620 A | * | 5/1998 | Yamamoto et al. ........... 463/34 |
| 6,064,393 A | * | 5/2000 | Lengyel et al. .............. 345/473 |
| 6,339,429 B1 | * | 1/2002 | Schug ......................... 345/589 |
| 6,417,856 B1 | * | 7/2002 | Tamura et al. .............. 345/474 |

FOREIGN PATENT DOCUMENTS

| | | |
|---|---|---|
| JP | 4-242281 | 8/1992 |
| JP | 7-116355 | 5/1995 |
| JP | 8-276070 | 10/1996 |
| JP | 09259303 | 10/1997 |
| JP | 9-325683 | 12/1997 |

OTHER PUBLICATIONS

M. Van De Panne et al., "Physically Based Modeling and Control of Turning," CVGIP Graphical Models and Image Processing, Academic Press, Duluth, MA, US, vol. 55, No. 6, Nov. 1, 1993, pp. 507–521.

Tsutsuguchi, Ken et al., "Terrain Adaptive Human Walking Animation," Systems and Computers in Japan, vol. 26, No. 5 (1995), pp. 79–87.

Umezu et al., "A Method for Visualization of Non–linear Phenomena by Space Subdivision", Information Processing Society of Japan, pp. 2–433–2–434, Mar. 1995.

* cited by examiner

Primary Examiner—Phu K. Nguyen
(74) Attorney, Agent, or Firm—Finnegan, Henderson, Farabow, Garrett & Dunner, L.L.P.

(57) ABSTRACT

The invention comprises establishing means for establishing the state of impact between a vehicle and a road surface specified by polygons in a virtual space, and generating means for generating image data representing a state where a vehicle moves along the road surface whilst maintaining the aforementioned state of impact. The establishing means comprises means for determining impact establishing data at an impact position of the vehicle by interpolation from vertex for the road surface polygons, correcting means for correcting this interpolated impact establishing data in accordance with indentations in the road surface, and specifying means for specifying the impact of the vehicle on the road surface in accordance with the corrected impact establishing data.

22 Claims, 14 Drawing Sheets

TEXTURE UV CO-ORDINATE SYSTEM

POLYGON XZ CO-ORDINATE SYSTEM

HEIGHT = $h(T)$ $1/SIN\theta = \infty$ WHEN $\theta = 0°$ $1/SIN\theta = 1$ WHEN $\theta = 90°$

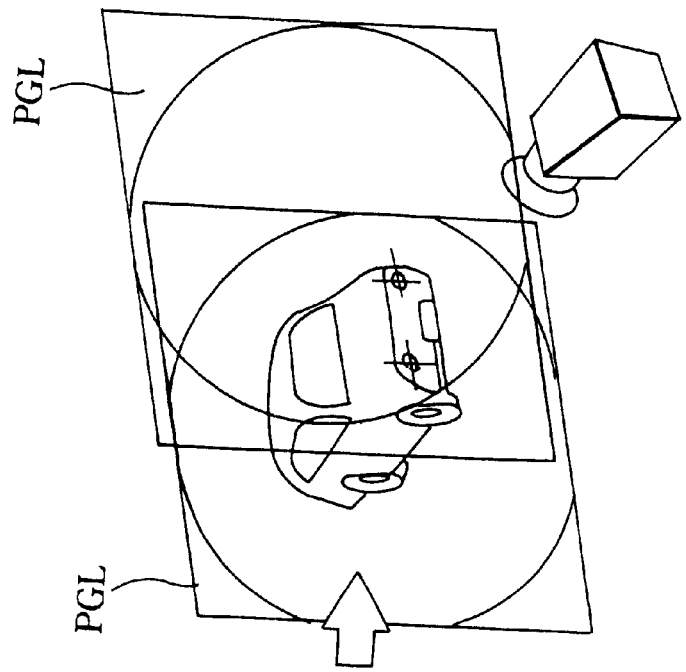
FIG.21(c)
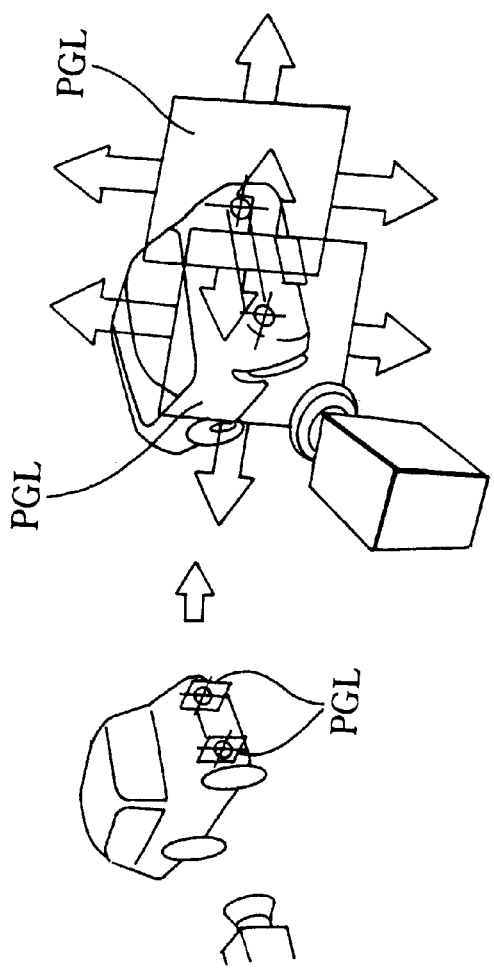
FIG.21(b)
FIG.21(a)

IMAGE GENERATING DEVICE AND IMAGE GENERATING METHOD

BACKGROUND OF THE INVENTION

1. Field of the Invention

The present invention relates to an image generating device and image generating method, and in particular, to an image generating device and image generating method whereby the relationship between moving objects moving within a virtual three-dimensional space and the surrounding environment, such as the path of travel, or the like, in a game device, or the like, can be represented more precisely and more realistically.

2. Description of the Related Art

With the progress of computer graphics technology in recent years, simulation devices and game devices have become widely used, in both industrial and domestic applications. One genre of game machines are devices portraying a car race game whereby a player competes by moving a car forming the object in the virtual game space, and such games are very popular.

Usually, game devices of this kind comprise a main unit containing an in-built computer device for executing previously determined game programs, an operating section for supplying operating signals indicating the movement of an object represented in the game to the device main unit, a monitor for displaying images accompanying the development of the game in accordance with the game program as executed by the main unit, and a sound device for generating sound accompanying the development of the game.

Since a car race game usually involves a game format where a player's car competes against rival cars, then if a game is to be made to feel more realistic, it is of course necessary to achieve a more realistic simulation of the movement of the cars, and an important factor in this is the precision and realism of image processing depicting elements such as the relationship between the car and the roadway or terrain (environment) forming a portion of the background, and moreover, the relationship between the vehicle and the surrounding environment.

However, in the case of conventional game machines for playing car racing games, unresolved problems of the following kinds have arisen in seeking to represent, in the form of images, factors relating to interference between the vehicle and the surrounding environment occurring as the car travels on its path.

(1) In order to represent the travelling state of the vehicle as an image, it is necessary to determine impacts between the terrain and the tyres (wheels) of the vehicle at uniform time intervals. In recent years, terrain has been depicted by an appropriate number of polygon data, wherein the terrain is divided up very finely. Each element of polygon data contains positional co-ordinates for a plurality of vertices, and data for a single normal vector relating to the whole surface of the polygon. Since conventional impact judgement processing is carried out with respect to the actual surface of the polygons (polygon surface co-ordinates), then in cases where two polygons adjoin at a relatively large angle, the direction of impact judgement when the vehicle passes the joint between the polygons may change suddenly, causing the car to display unnatural behaviour. For example, even if the car is travelling along a section of road which appears to be relatively smooth, since there is a large angle between the polygon surfaces, the direction of the vehicle will change suddenly from a roll direction, to a pitch direction, to a yaw direction, hence creating an alien feel to the player.

Of course, if the size of a single polygon surface relating to the road surface or the terrain representing the surrounding environment is made extremely small compared to the size of the tyres, then the smoothness of the terrain as a whole will be improved accordingly and hence the aforementioned sudden changes in the direction of impact judgement will not be liable to occur. However, setting the polygon surfaces to a small size in this way entails a corresponding increase in the amount of data relating to the terrain, and hence the amount of storage capacity required in the memory becomes very large and the calculational load on the CPU of the computer device increases markedly. Even supposing that a memory with such a large storage capacity could be installed, there would still be a decline in processing speed in the device as a whole. Any decline in processing speed would be extremely disadvantageous in current game devices, and would have an effect on marketability. Consequently, there is a natural limit on the size to which the polygon surfaces can be set.

Furthermore, in addition to changes in behaviour between two polygon surfaces, the behaviour of the vehicle depicting fine indentations in each polygon surface is also extremely important in raising game realism. Conventionally, when seeking to depict this effect, height information for these indentations is previously stored for each polygon (texture), and it is necessary to judge impacts with respect to this indentation height information, creating a huge volume of data and computational load and hence proving impossible to achieve in practice.

Moreover, one of the factors where the behaviour of the vehicle affects the surrounding environment is the generation of dust clouds from the road surface and terrain accompanying the movement of the car. These dust clouds are an extremely important factor in creating a realistic depiction of the state of the road surface and the state of travel, namely, the speed and acceleration of the vehicle.

Despite this, conventionally, image processing relating to dust clouds has been very hard to achieve, and in many cases, dust clouds have not been depicted due to the poor quality of such depictions. Where an attempt has been made to represent dust clouds, this has simply involved superimposing one or a plurality of polygons representing the outer surface of a haze (cloud) of dust, three-dimensionally onto the background, or the like. Therefore, an object representing a cloud of dust having a very clearly defined outline is depicted flying out behind the car.

However, in reality, dust clouds are not often apparent at a single glance, and hence such representations have a very artificial appearance. Therefore, in order to create an impression of the particles making up the dust cloud, in many cases, an impression of dust particles has been introduced by means of image processing which reduces the presence of the cloud as a polygon, but even in these cases, the resulting dust clouds have lacked realism. Moreover, in some instances, for example, when a rival car accelerates past the player's car, the position of the viewpoint camera may enter into the dust cloud atmosphere. In such cases, even though the viewpoint camera is located in the middle of a cloud of dust, conventionally, it has only been possible to generate an image of an unnatural state, where only the outer surface of the cloud of dust is visible, as if the camera is in a tunnel where only the walls of the tunnel are depicted.

A further factor whereby the moving vehicle interferes with the surrounding environment relates to the headlights and tail lamps lit up on the vehicle, and moreover, there is also light created by imaginary sunlight reflected by parts of the vehicle in the game space.

In a conventional game device, when such objects having high brightness are represented, a method is adopted whereby, either the colours of the objects themselves are depicted brightly, or they are depicted by using a fog effect created by an installed hardware unit, or they are depicted by placing a single layer, which changes from transparent to opaque from the edge of the light object towards the centre thereof, at the point of light emission and extending towards the player's car.

However, these methods only depict light shining from the object, and none is capable of representing the orientation of the dispersed light from the moving object, which is an essential characteristic thereof, and hence the sensation of light emanating dynamically from the moving vehicle is lacking.

Looking at the example of headlights in the case of the third method described above, for instance, an unnatural effect is created whereby there is dispersion of light even when the vehicle in question is viewed from behind.

The present invention was devised in order to overcome the aforementioned unresolved problems associated with game devices, a common object thereof being to provide an image generating device and image generating method whereby factors relating to interference between a vehicle forming a moving body and the surrounding environment thereof, can be represented more realistically, hence increasing the sense of realism in games based on the main theme of a moving vehicle, and also raising the interest created thereby, without markedly increasing the computational load or data volume involved.

Specifically, a first object of the present invention is to provide an image generating device and image generating method having markedly improved realism and authenticity in the representation of vehicle behaviour compared to the prior art, by implementing more natural impact judgement processing which creates few alien effects by preventing sudden changes in the judgement direction in the case of impact judgement processing when a vehicle crosses the joint between two polygons, and by implementing impact judgement processing which takes indentations in the road surface into consideration, without markedly increasing the computational load or data volume involved therein.

It is a second object of the present invention to provide an image generating device and an image generating method whereby the alien effect created by conventional smooth or artificial-looking dust clouds is eliminated by depicting the sensation of particles making up a dust cloud, and furthermore, dust clouds can be represented without creating alien effects in the state of the cloud as viewed from the camera viewpoint, even in cases where the camera viewpoint is located spatially inside a dust cloud, without markedly increasing the computational load or data volume involved therein.

It is a third object of the present invention to provide an image generating device and image generating method whereby images of dispersed light having an orientation, such as headlights, tail lamps, or reflected light, emitted from a moving vehicle, can be generated in a dynamic fashion, and hence dispersed light can be represented in a more realistic manner, without markedly increasing the computational load or data volume involved therein.

SUMMARY OF THE INVENTION

In order to achieve the aforementioned objects, the image generating device relating to a first aspect of the invention comprises: impact establishing means for establishing the state of impact between an object and a path of travel specified by polygons in a virtual three-dimensional space; and generating means for generating image data representing a state where the object moves along the path of travel whilst maintaining the aforementioned state of impact; wherein the impact establishing means comprises: interpolating means for determining impact establishing data at an impact position of the object by interpolation from vertex data assigned to the vertices of the polygons of the path of travel; and impact specifying means for specifying the impact of the object on the path of travel in accordance with the impact establishing data interpolated by the interpolating means.

For example, the vertex data comprises the height and normal vector of each vertex, and the impact establishing data comprises the height and normal vector of the impact position. Moreover, for example, the interpolating means comprises: means for specifying respectively two edges of the polygon intersecting orthogonally and extending from the impact position in parallel with co-ordinate axes; means for setting a first and a second ridgeline on the basis of the vertex data for each end of the edges; means for determining respective data for the intersection points of the ridgelines with the two edges; means for specifying a third ridgeline of a segment having ends at the intersection points with the two edges; and means for determining the impact establishing data at the impact judging position from the respective data for the intersection points on this third ridgeline. Desirably, the first to third ridgelines are given as tertiary equations.

Moreover, the image generating device relating to a second aspect of the invention comprises: impact establishing means for establishing the state of impact between an object and a path of travel specified by polygons in a virtual three-dimensional space; and image data generating means for generating image data representing a state where the object moves along the path of travel whilst maintaining the aforementioned state of impact; wherein the impact establishing means comprises: correcting means for correcting the impact establishing data at the impact position of the object in accordance with the attributes of the path of travel represented by the polygons; and impact specifying means for specifying the impact of the object on the path of travel in accordance with the impact establishing data corrected by the correcting means.

For example, the impact establishing data is the height and normal vector of the impact position. Furthermore, for example, the attributes of the path of travel are indentations in the path of travel, and light and shade data supplied as texture for attaching to the polygons is used as information for the indentations.

The image generating device relating to a third aspect of the invention comprises: impact establishing means for establishing the state of impact between an object and a path of travel specified by polygons in a virtual three-dimensional space; and image data generating means for generating image data representing a state where the object moves along the path of travel whilst maintaining the aforementioned state of impact; wherein the impact establishing means comprises: interpolating means for determining impact establishing data at an impact position of the object by interpolation from vertex data assigned to the vertices of the polygons of the path of travel; correcting means for correcting the impact establishing data interpolated by the interpolating means in accordance with the attributes of the path of travel represented by the polygons; and specifying means for specifying the impact of the object on the path of travel in accordance with the impact establishing data corrected by the correcting means. For example, the impact establishing data is the height and normal vector of the impact position.

The image generating device relating to a fourth aspect of the invention comprises: dispersed light controlling means for controlling image data for dispersed light emitted from a light source on an object moving in a virtual three-dimensional space, in accordance with the state of movement of the object; and generating means for generating image data representing the state of movement of the object including this controlled image data for dispersed light.

Desirably, the dispersed light controlling means comprises: means for determining a light source vector representing the orientation of the light source and a line of sight vector representing the orientation of a camera viewpoint in the virtual three-dimensional space; means for specifying a single polygon as image data for the dispersed light; and changing means for changing the size of the polygon on the basis of information relating to the angle between the two vectors.

Moreover, desirably the changing means is means for changing the size of the polygon by multiplying by a coefficient which expands to infinity when the orientations of the two vectors coincide with each other.

The image generating device relating to a fifth aspect of the invention comprises: dust cloud controlling means for controlling image data for a dust cloud generated by an object moving in a virtual three-dimensional space, in accordance with the state of movement of the object; and generating means for generating image data representing the state of movement of the object including this controlled dust cloud image data.

In a desirable example of this case, the dust cloud controlling means comprises: means for specifying the dust cloud image data as a plurality of polygons; means for determining the degrees of physical influence exerted by factors including the behaviour of the object; means for calculating the respective behaviour of the plurality of polygons in accordance with these degrees of influence; and means for linking the plurality of polygons together and reconstituting same as a polygon group in accordance with these calculation results. Moreover, for example, the dust cloud controlling means may comprise means for applying processing to the reconstituted polygon group for imparting changes in transparency and a mist-like shape associated with the appearance of a dust cloud.

In any of the foregoing compositions, the object may be a car in a car race game moving in the virtual three-dimensional space.

The image generating method relating sixth aspect of the invention is an image generating method for generating image data representing the state of an object specified by polygons in a virtual three-dimensional space moving along a path of travel, whilst establishing the state of impact between the object and the path of travel, wherein impact establishing data at the impact position of the object is determined by interpolation from vertex data assigned to the vertices of the polygons of the path of travel, and the impact of the object on the path of travel is specified in accordance with this interpolated impact establishing data.

Moreover, the image generating method relating to a seventh aspect of the invention is an image generating method for generating image data representing the state of an object specified by polygons in a virtual three-dimensional space moving along a path of travel, whilst establishing the state of impact between the object and the path of travel, wherein impact establishing data at the impact position of the object is corrected in accordance with attributes of the path of travel represented by the polygons, and the impact of the object on the path of travel is specified in accordance with this corrected impact establishing data.

In the image generating method relating to an eighth aspect of the invention, the size and intensity of dispersed light emitted from a light source on an object moving in a virtual three-dimensional space are caused to increase as the direction of the dispersed light approaches the direction of a camera viewpoint in the space.

Moreover, in the image generating method relating to a ninth aspect of the invention, a dust cloud generated by an object moving in a virtual three-dimensional space is caused to change shape in accordance with the behaviour of the object, and the sense of transparency thereof is caused to increase towards the outer edges thereof.

BRIEF DESCRIPTION OF THE DRAWINGS

FIG. 21 is a diagram for illustrating processing for representing dispersed light.

DESCRIPTION OF THE PREFERRED EMBODIMENTS

Below, one embodiment of the present invention is described with reference to the drawings.

Figure 1:
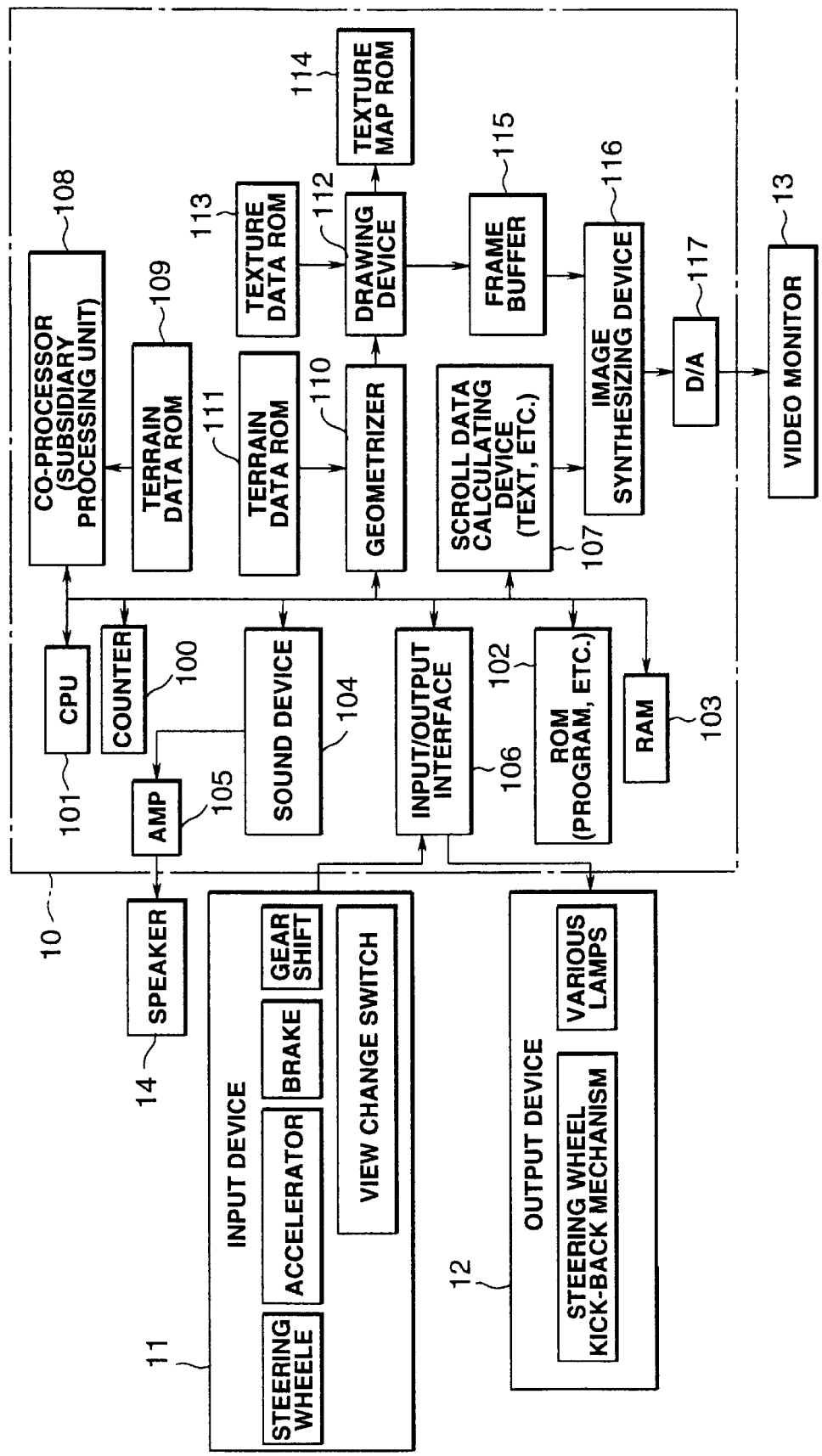
FIG. 1 is a block diagram showing the composition of a game device relating to one embodiment of the present invention.

The game device shown in FIG. 1 is one mode of implementing an image generating device and image generating method relating to the present invention. This device comprises, as fundamental elements, a game processing board 10, an input device 11, output device 12, video monitor 13 and speaker 14.

The input device 11 comprises a steering wheel, accelerator, brake, gear shift lever, view change switch, and the like. The output device 13 comprises a steering wheel kick-back mechanism, and various display lamps, etc. The video monitor 13 displays images of a car race game, and a projector may be used instead of the video monitor. The view change switch is a switch for changing the position of an imaginary camera viewpoint. By operating this switch, the player is able to select, for example, a forward viewpoint looking from the driver's seat, a viewpoint looking at the car obliquely from the rear, or the like.

The game processing board 10 comprises a counter 100, CPU (central processing unit) 101, a ROM 102 acting as a storage medium for recording operating programs and data for the game device, a RAM 103, sound device 104, input/output interface 106, scroll data calculating device 107, co-processor (subsidiary processing unit) 108, terrain data ROM 109, geometrizer 110, shape data ROM 111, drawing device 112, texture data ROM 113, texture map RAM 114, frame buffer 115, image synthesizing device 116, and D/A converter 1127.

Of these, the CPU 101 is connected via a bus line to the counter 100, which counts down from an initial value, the ROM 102, which stores prescribed programs and image processing programs, etc., the RAM 103 storing calculational data, the sound device 104, input/output interface 106, scroll data calculating device 107, co-processor 108, and geometrizer 110.

The RAM 103 functions as a buffer, and is used for writing various commands to the geometrizer (to display objects, etc.) and for writing data required when making various calculations, including calculation of conversion matrices.

The input/output interface 106 is connected to the input device 11 and output device 12, and various operating signals and detection signals from the input device 11 are input to the CPU 101 as digital quantities. Signals generated by the CPU 101, and the like, can be supplied to the output device 12.

The sound device 104 is connected via a power amplifier 105 to a speaker 14. Thereby, a sound signal generated by the sound device 104 is power amplified and then output from the speaker 14 in the form of sound.

On the basis of the programs contained in the ROM 102, the CPU 101 reads out operating signals from the input device 11, and terrain data from the terrain data ROM 109 or shape data from the shape data ROM 111 (three-dimensional data for "objects, such as the player's car, rival cars, etc." and "background, such as road surface, terrain, sky, spectators, structural objects, etc."), whereupon calculations for judging impact between the terrain and the car, judging impacts between cars, calculating the behaviour of 4-wheel suspension, and behaviour simulation for calculating the behaviour of the car, are performed, as well as special effects processing, including processing for generating dust clouds and processing for generating and controlling dispersed light.

The car behaviour calculation simulates the movements of the car in the virtual three-dimensional space (game space) using the operating signals imparted by the player via the input device 11. In order to perform this step, after the co-ordinate values for the polygons constituting the car in the virtual three-dimensional space have been determined, these co-ordinate values are then supplied to the geometrizer 110 along with shape data (polygon data) and a conversion matrix for converting the co-ordinates to a two-dimensional viewpoint co-ordinate system. The co-processor 108 is connected to the terrain data ROM 108, and previously determined terrain data is transferred to the co-processor 108 and the CPU 101. The co-processor 108 principally undertakes floating-point calculations during the steps of judging impact between the terrain and the car and calculating the behaviour of the car.

Therefore, the calculational load on the CPU can be reduced.

The geometrizer 110 is connected to the shape data ROM 111 and the drawing device 112. As stated previously, shape data consisting of a plurality of polygons (three-dimensional data for cars, terrain, background, etc., comprising three or more vertices) is previously stored in the shape data ROM 111. This shape data is transferred to the geometrizer 110, which carries out perspective conversion of the indicated shape data using a conversion matrix designated by the CPU 101, thereby yielding shape data which has been converted from a co-ordinates system in a three-dimensional virtual space to a viewpoint co-ordinates system.

The drawing device 112 attaches texture to this converted shape data in the viewpoint co-ordinates system, and outputs the data to the frame buffer 115. In order to attach texture to the data, the drawing device 112 is connected to the texture data ROM 113 and the texture map RAM 114, as well as being connected to the frame buffer 115.

Polygon data refers to a co-ordinate data group for the relative or absolute co-ordinates of each vertex of polygons (principally, three or four-sided shapes) consisting of a set of three or more vertices. The aforementioned terrain data ROM 109 stores polygon data which is set in relatively coarse terms sufficient for carrying out the prescribed judgement processes (impact judgement, and the like). The shape data ROM 111, on the other hand, stores polygon data set in more precise terms, relating to the shapes constituting the images of the car, background, and the like.

The scroll data calculating device 107 calculates data for scroll images, such as text, or the like (stored in ROM 102).

This calculating device 107 and the frame buffer 115 lead via an image synthesizing device 116 and a D/A converter 117 to the video monitor. Thereby, polygon images (simulation results) for the car, terrain (background), and the like, stored temporarily in the frame buffer 115 are synthesized with scroll images of text information, such as the speed, lap time, etc., according to a designated priority, and the final image data is generated for each frame at a uniform timing.

This image data is converted to an analogue signal by the D/A converter 117 and then supplied to the video monitor 13, where it is displayed on the game screen in real time.

Action (Main routine processing)

Figure 2:
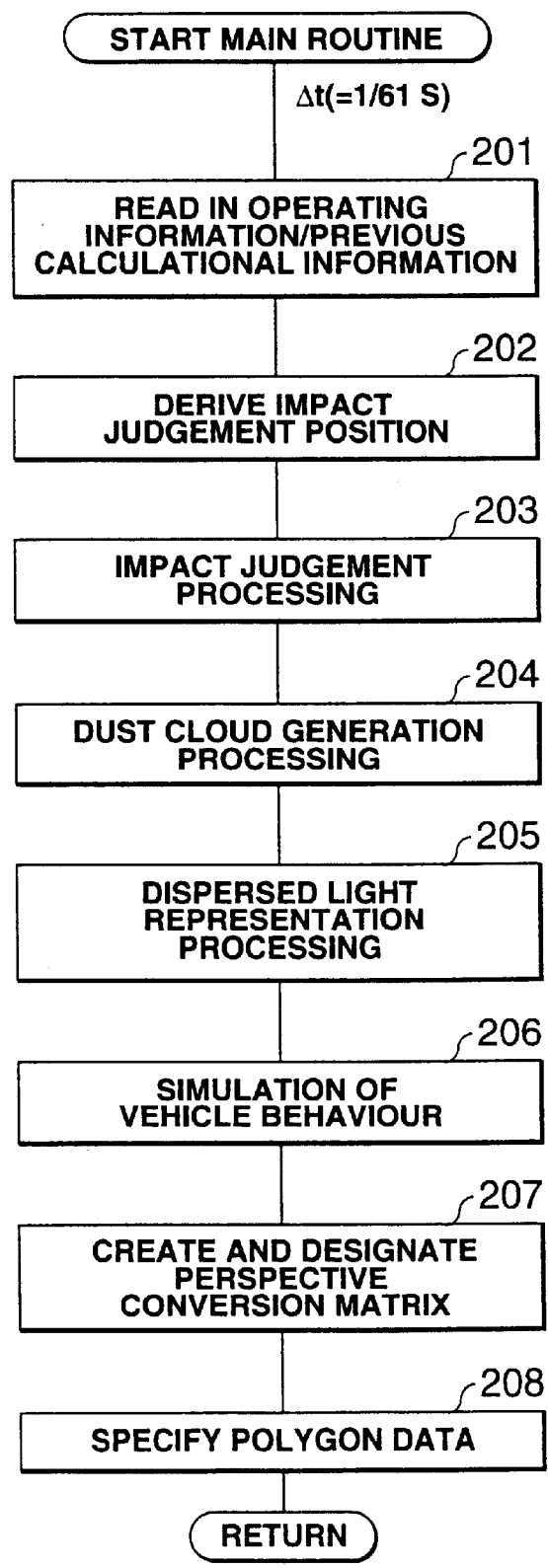
FIG. 2 is a diagram showing a main procedure of operations implemented principally by the CPU.

Next, image generation processing relating to a car race in the game device according to the present embodiment will be described. FIG. 2 shows a main routine for image generation processing. This main routine is, for example, repeated by the CPU 101 for each field (1/60th second) in synchronism with a display interrupt. In the image screen, at the least, a vehicle and a road surface forming the path on which the vehicle is travelling are formed by a plurality of polygons (for example, triangular polygons). In particular, for each vertex of each polygon representing the road surface, information relating to the height from a reference position within the virtual space (in other words, vertex position information,) and a normal vector at the vertex position are supplied, this information being stored previously in a memory.

Firstly, the CPU 101 reads in operating information from the player as detected via the input device 11 and calculational information computed during the preceding interrupt (step 201). In this, operating information includes, for example, the angle of the steering wheel and the angle of the accelerator, as operated by the player. Moreover, the calculational information includes the positions of the player's car and the rival cars, the vehicle behaviour information, and special effects processing relating to dust clouds, dispersed light, and the like, computed by the CPU 101. The player's car is controlled by the CPU 101 on the basis of the operating information, and the rival cars are controlled independently by the CPU 101 on the basis of a predetermined program.

Thereupon, impact judgement positions for each vehicle (ground. impact position of car tyres) during the preceding interrupt are calculated on the basis of the aforementioned operating information and the calculational information during the preceding interrupt (positions and direction of travel of player's car and rival cars, etc.) (step 202).

The CPU 101 then carries out impact judgement processing for each of the impact judgement positions of each vehicle (step 203). Thereupon, as special effects relating to the vehicle behaviour, processing for generating dust clouds and processing for depicting dispersed light are carried out, sequentially (steps 204, 205). The processing involved in steps 203–205 is described later.

The CPU 101 then calculates vehicle behaviour taking into account the operating information and impact judgement results (step 206), creates and designates a perspective conversion matrix (step 207), and specifies the polygon data, and the like, required for image drawing (step 208). By this means, the image data is updated at each interrupt, and images accompanying the development of the car race game are displayed on the video monitor 13, along with other text information. In this way, the player is able to play a game by supplying desired operational inputs via the input device 11, whilst watching the display screen.

(Impact Judgement Processing)

Here, the impact judgement processing carried out in step 203 will be described in detail, along with the principles of said processing, with reference to FIG. 3–FIG. 10.

Figure 3:
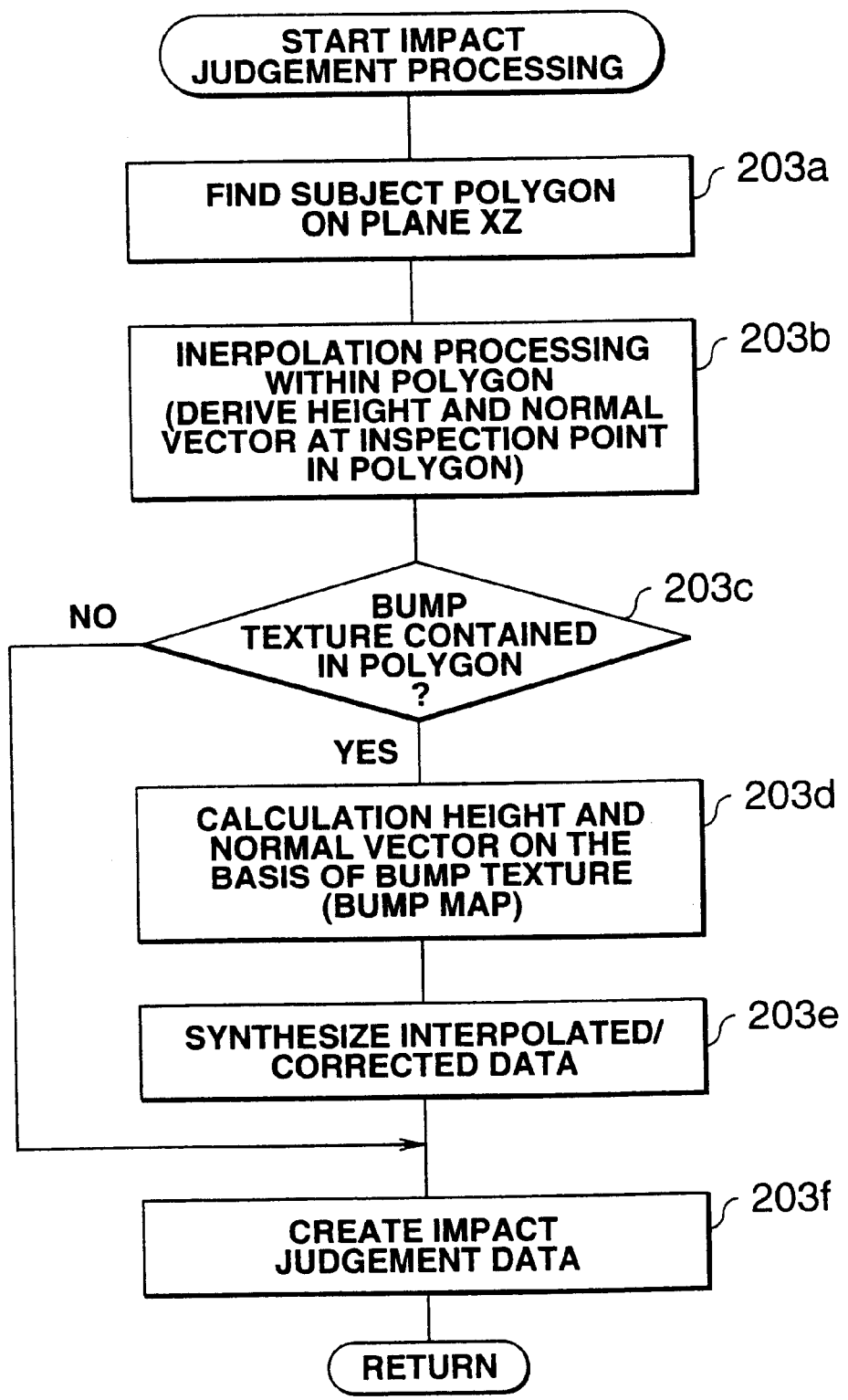
FIG. 3 is a diagram of a subsidiary procedure showing an outline of impact judgement processing.
Figure 4:
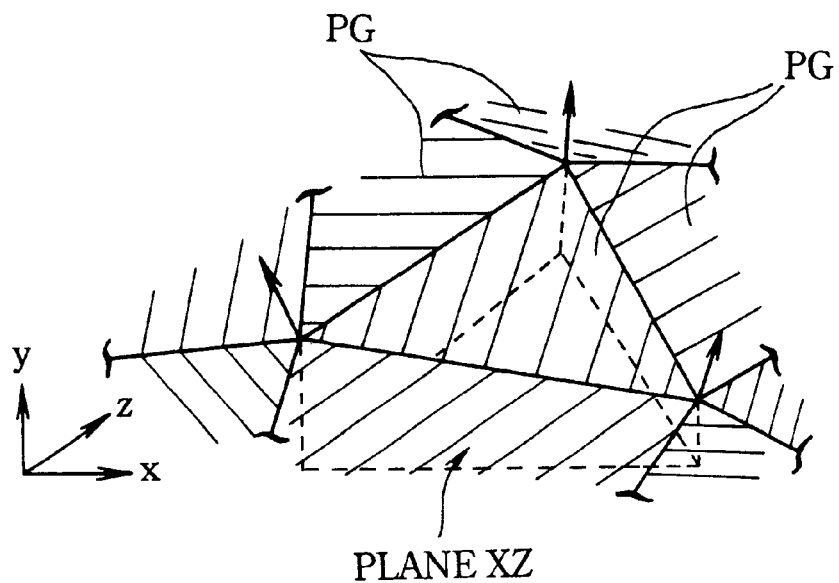
FIG. 4 is a schematic diagram showing the arrangement of a plurality of polygons constituting a road surface.

FIG. 3 shows a subsidiary routine of processing implemented in step 203. By means of this routine, it is possible to find, from a plurality of polygons PG forming a road surface set as illustrated in FIG. 4, the polygons to be subjected to impact judgement processing which contain the impact judgement points calculated for each vehicle, on the plane xz in the virtual three-dimensional space (step 203a).

Thereupon, the height of the impact judgement point and the normal vector for the subject polygon are newly calculated by interpolation (step 203b). This calculation method is described below.

Figure 5:
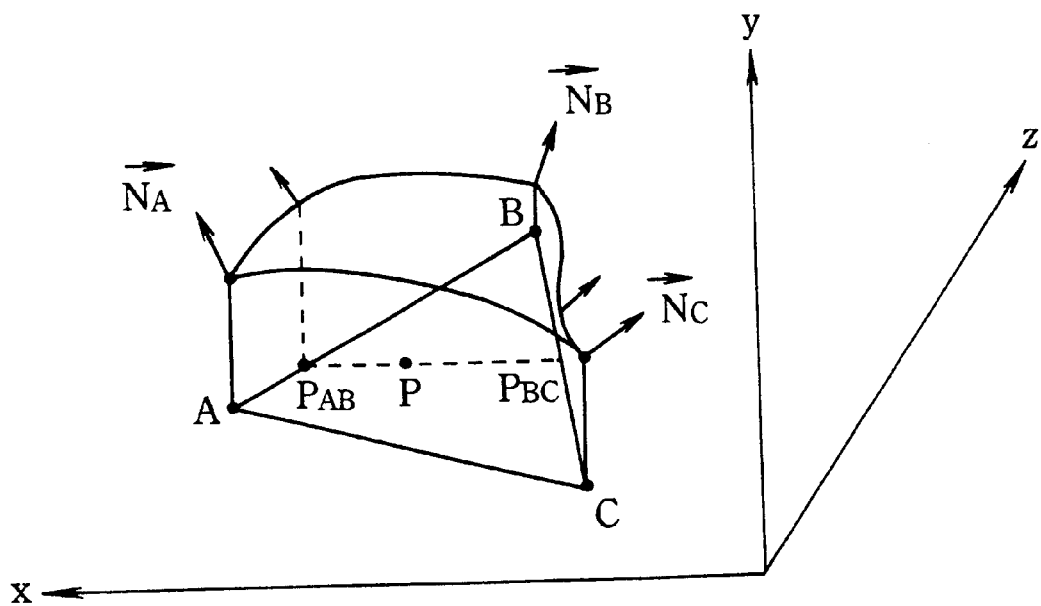
FIG. 5 is a diagram for illustrating a procedure for interpolation processing within a polygon in impact judgement processing.
Figure 6:
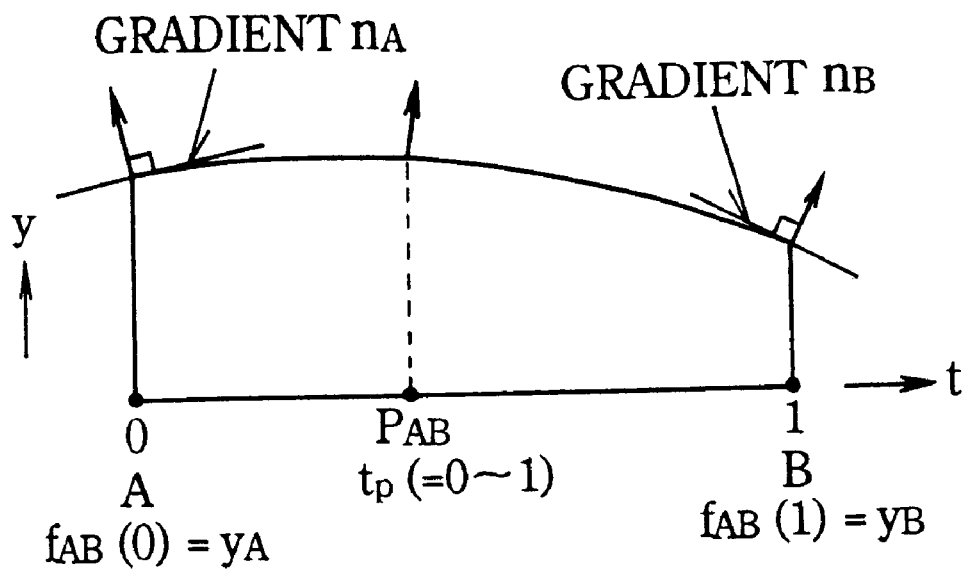
FIG. 6 is a diagram for illustrating a procedure for interpolation processing within a polygon in impact judgement a processing.

As illustrated in FIG. 5, the subject polygon is taken as polygon ABC, and the judgement point located in this polygon is taken as P (Px, Pz). If the judgement point P is taken parallel to the x axis, then it will encounter either edge AB or edge BC of polygon ABC. The corresponding intersection points are labelled $P_{AB}$ and $P_{BC}$, respectively. Let us now consider a two-dimensional system comprising the edge AB and the y axis, for example. As illustrated in FIG. 5 and FIG. 6, a curve linking a segment apex of height $y_A$ at point A and a segment apex of height $y_B$ at point B can be hypothesized. This curve is called a ridgeline.

By introducing a positional parameter t where t=0 at point A and t=1 at point B, a formula $f_{AB}(t)$ expressing the aforementioned ridgeline can be hypothesized as follows:

$$f_{AB}(t)=y=at3+bt2+ct+d \qquad (1)$$

(See FIG. 6). From boundary conditions, it can be determined that:

$f(0)=d=y_A$=height at point A $f(1)=a+b+c+d=y_B$=height at point B $f'(0)=c=n_A$=gradient of normal at point A $f'(1)=3a+2b+c=n_B$=gradient of normal at point B and from this, the coefficients can be calculated as follows:

$a=2y_A-2y_B+n_A+n_B$ $b=-3y_A+3y_B-2n_A-n_B$ $c=n_A$

Consequently, since the heights $y_A$, $y_B$ at points A, B and the gradients of the normal lines $n_A$, $n_B$ are supplied previously, the coefficients a, b, c, d can be calculated. Therefore, the coefficients a, b, c, d, specifying the ridgeline relating to points A, B can be calculated as required in real time, or they can be calculated beforehand, stored in a memory in the form of coefficient table data, and read out as required. The latter option is advantageous from the viewpoint of processing speed.

By putting the calculated or read out coefficient values a, b, c, d into the function $f_{AB}$ in equation (1), the functional value $f_{AB}(P_{AB})$ at intersection point $P_{AB}$ is determined. Therefore, the co-ordinates of point $P_{AB}$ are (Px', $f_{AB}$(P'), Pz). Here, Px' is the co-ordinate position of the intersection between P and AB when P is moved along the X axis. The function value in this case is P'.

Furthermore, the normal vector Np' at intersection point $P_{AB}$ is calculated by linear interpolation of the normal vectors $N_A$, $N_B$ at point A and point B, by means of the following equation.

$$\text{Vector } Np'=[(1-t_p)N_A+t_pN_B]/|(N_A+N_B)| \qquad (2)$$

The co-ordinates of the intersection point $P_{BC}$ and the normal vector on the other edge BC are calculated in a similar manner to the above, on the basis of a ridgeline formed by this other edge BC.

Figure 7:
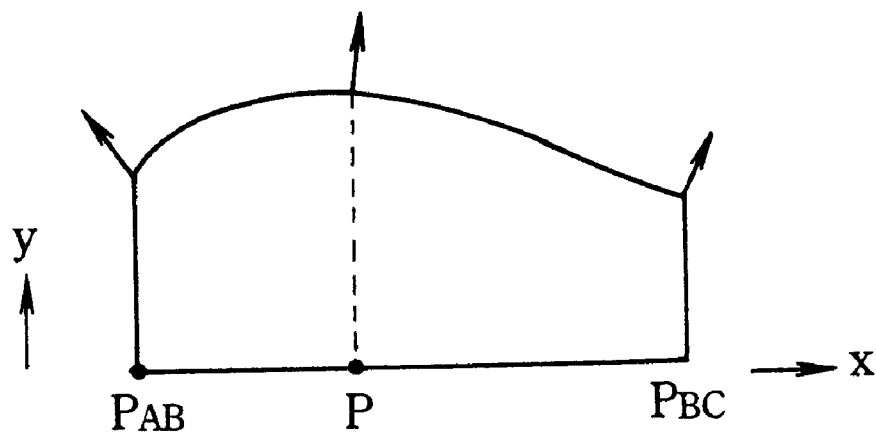
FIG. 7 is a diagram for illustrating a procedure for interpolation processing within a polygon in impact judgement processing.

Moreover, for the segment $P_{AB}P_{BC}$ between the aforementioned two intersection points $P_{AB}$ and $P_{BC}$, a ridgeline based on a tertiary equation as illustrated in FIG. 7 can be hypothesized, in a similar manner to the foregoing, and the y co-ordinate (height) and normal vector (size, direction) at judgement point P can be calculated on the basis of this ridgeline. In this way, information relating to the y co-ordinate (height) and the normal vector at judgement point P can be derived simply from the height information and normal vector information for the polygon vertices.

Moreover, rather than limiting the edges of the subject polygon used in this calculation to edge AB and edge BC only, it is also possible to use edge AC and edge AB by taking the impact judgement point P parallel to the z axis. In brief, any two edges should be used.

Thereupon, in FIG. 3, CPU 101 carries out processing for applying fine corrections to the height and normal vector at the impact judgement point P, based on the bumps (indentations) in the road surface (steps 203c, 203d, 203e).

This correction processing is carried out by regarding the light and shade of the texture used for creating bumps as height information representing indentations on the road surface, and this processing is called bump processing. A characteristic feature of this processing is that the attributes of the texture applied to the polygon are used for bump correction (in other words, ultimately, for impact judgement), and besides the light and shade of the texture described above, it is also possible to carry out bump correction by using items, like grass, stones, etc., supplied as texture, as bump information.

In step 203c, it is determined whether or not bump texture has been applied within the polygon currently under processing, using a flag, or the like. If no bump texture has been applied (NO), then step 203d is skipped. If bump texture has been applied (YES), then at step 203d, the height and normal vector are calculated at an impact judgement position based on the bump texture. This calculation procedure is described in detail below.

Figure 8:
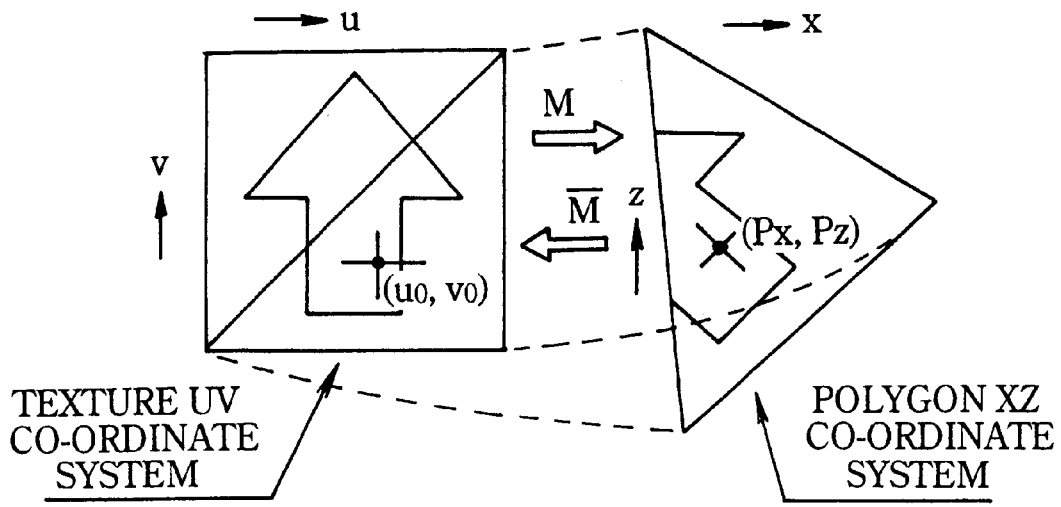
FIG. 8 is a diagram for illustrating a procedure for bump correction processing in impact judgement processing.

In general, as illustrated in FIG. 8, in the uv co-ordinate system for the texture and the xz co-ordinate system for the polygon, three-point images are expressed by the following matrices M, M^. In other words, conversion from the uv co-ordinate system to the xz co-ordinate system can be achieved using $$M = \begin{vmatrix} m_{00} & m_{01} & 0 \\ m_{10} & m_{11} & 0 \\ m_{20} & m_{21} & 1 \end{vmatrix}$$

and conversion from the xz co-ordinate system to the uv co-ordinate system can be achieved using $$M = \begin{vmatrix} m_{00} & m_{01} & 0 \\ m_{10} & m_{11} & 0 \\ m_{20} & m_{21} & 1 \end{vmatrix}.$$

Figure 9:
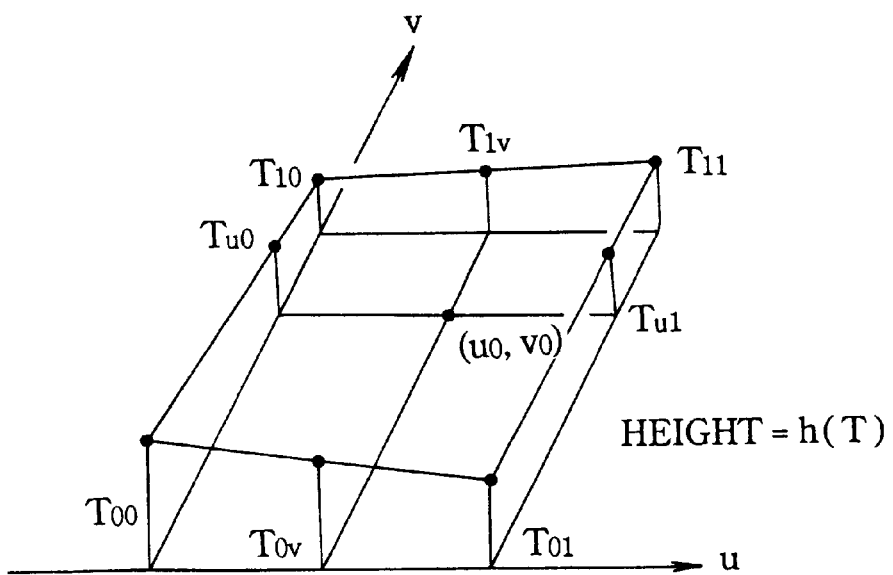
FIG. 9 is a diagram for illustrating a procedure for bump correction processing in impact judgement processing.

If four pixels surrounding the point $(u_0, v_0)$ corresponding to the impact judgement position in the uv co-ordinate system are selected as illustrated in FIG. 9, then these four pixels will respectively have height data $T_{00}, T_{10}, T_{11}, T_{01}$.

The heights $T_{00}, T_{01}$ at position $v_0$ are calculated respectively by linear interpolation with respect to the height data $T_{00}$–$T_{10}$ corresponding to the two pixels on one edge parallel to the v axis and the height data $T_{01}$–$T_{11}$ corresponding to the two pixels on the other such edge.

Similarly, the heights $T_{0v}, T_{1v}$ at position $u_0$ are calculated respectively by linear interpolation with respect to the height data $T_{00}$–$T_{01}$ corresponding to the two pixels on one edge parallel to the u axis and the height data $T_{10}$–$T_{11}$ corresponding to the two pixels on the other such edge.

Thereupon, from this interpolated height data, the gradient of the height data Tu0–Tu1 for a segment drawn parallel to the u axis is derived and this is taken as the differential value in the u-axis direction (=gradient) at the point $(u_0, v_0)$.

Furthermore, the gradient of the height data $T_{0v}$–$T_{1v}$ for a segment drawn parallel to the v axis is also derived and this is taken as the differential value in the v-axis direction at the point $(u_0, v_0)$ These two gradients are converted to tangential vectors du, dv in the directions of the u and v axes, and these vectors are converted from the texture uv co-ordinate system to the polygon xz co-ordinate system, by means of the matrix M described above.

Figure 10:
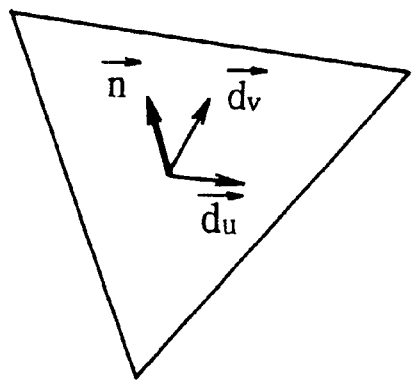
FIG. 10 is a diagram for illustrating a procedure for bump correction processing in impact judgement processing.

Furthermore, the straight line intersecting orthogonally with both of the two converted tangential vectors du, dv, becomes the bump corrected normal vector at the impact judgement point P (Px, Pz) (see FIG. 10). The bump corrected height at the impact judgement point P (Px, pz) is derived by bilinear interpolation of the height data for the four pixels.

Thereupon, the CPU 101 moves to step 203e in FIG. 3, where the final height and normal vector for the impact judgement position are synthesized from the interpolated data (height, normal vector) based on the polygon calculated in step 203b above and the bump interpolated data (height, normal vector) calculated in step 203d. For the height, the two values are added or subtracted.

Figure 11:
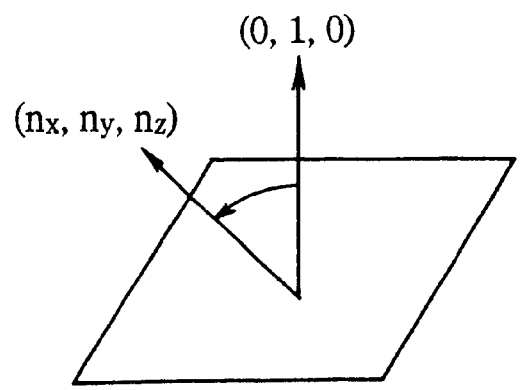
FIG. 11 is a diagram for illustrating a procedure for bump correction processing in impact judgement processing.

The normal vectors, on the other hand, are converted as follows. The normal vector obtained by interpolation based on the polygon is taken as vector n and the normal vector obtained by bump interpolation is taken as vector m. Since vector m assumes a normal direction when the vector n is pointing directly vertical (0,1,0), then in accordance with this a conversion matrix is derived for converting (0,1,0) to vector n (see FIG. 11). The vector m is then converted using this conversion matrix. The converted vector m forms the final synthesized normal vector.

In this way, the height and normal vector data interpolated within the polygon is corrected more finely by bump correction.

The final height data and normal vector data for the impact judgement position obtained as a result of this processing is used to determine the impact between the tyres of the vehicle and the subject polygon (FIG. 3; step 203f).

Continuous impact judgement is carried out for each tyre of both the player's cars and the rival cars, by performing the sequence of impact judgement processing steps described above repeatedly at uniform short time intervals.

According to the present embodiment, firstly, the height and normal vector at the impact judgement position are interpolated from the polygon data. Therefore, since the direction of the normal vector supplied as the impact judgement direction changes remarkably smoothly compared to conventional methods, even if the impact judgement position transfers from one polygon to another polygon where there is an angle differential between the polygon surfaces, then the direction of impact judgement can be changed smoothly, and hence the accuracy of impact judgement is improved compared to conventional methods, and it is possible to eliminate the generation of alien effects.

Therefore, in the present embodiment, a two-stage correction method is adopted, whereby the height and normal vector interpolated on the basis of the polygon as described above are subjected further to bump correction by means of the light and shade data forming texture attributes. Therefore, after smoothly effecting broad changes in the height of the road surface, impact judgement is carried out using height and normal vector data which reflects precisely the fine indentations in the road surface, and hence the accuracy of impact judgement is extremely high and vehicle behaviour can be simulated in a manner which conveys the attributes of the road surface more accurately.

A further merit is obtained in that it is not always necessary to use both interpolation processing based on the polygon data and interpolation processing based on texture, as described above, and even in cases where only one of these processes is carried out independently, the accuracy of the judgement processing is extremely high compared to conventional impact judgement.

(Processing for Generating Dust Clouds)

Figure 12:
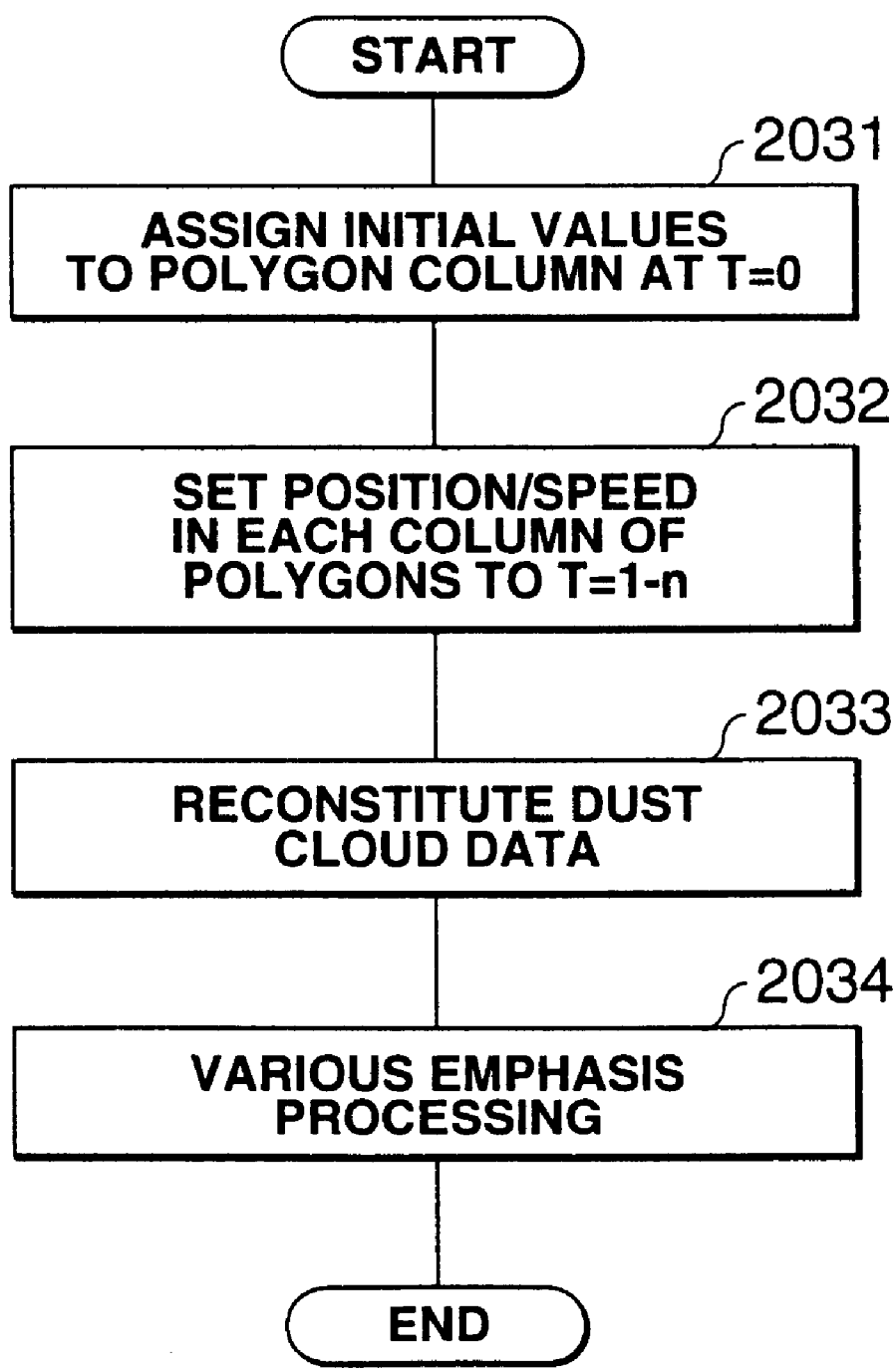
FIG. 12 is a diagram for illustrating a summary procedure for processing for generating a dust cloud.

Next, processing for generating dust clouds according to step 204 of FIG. 2 is described. When impact judgement processing has been completed as described above, the CPU 101 carries out dust cloud generation processing in order to create a sense of realism on the display screen, as one type of special effects processing for the car race game. This processing is described with reference to FIG. 12–FIG. 16. An outline of the processing sequence involved is shown in FIG. 12.

Figure 13:
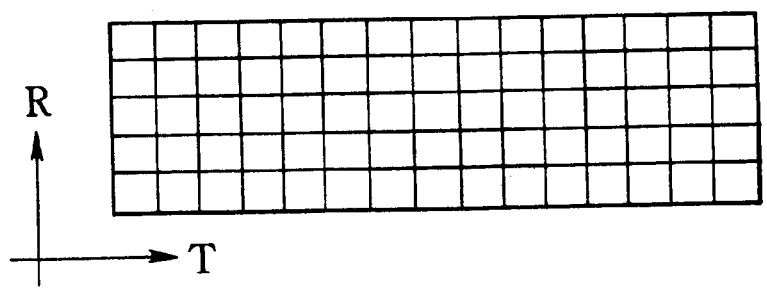
FIG. 13 is a diagram for illustrating processing for generating a dust cloud.

Firstly, a set of polygons in a lattice shape are stored previously in the memory as polygon data for representing a dust cloud. FIG. 13 gives a schematic illustration of one example of such a set of polygons, which forms a two-dimensional map wherein the vertical direction R represents the resolution dimension of the dust and the horizontal direction T represents the time axis dimension. To give a specific example, the number of polygons in the vertical direction Rmax=5, and the number of polygons in the horizontal direction Tmax=20. These polygon numbers may be determined as appropriate in accordance with the precision of the display and the computational load.

The current spatial position, velocity, and other parameters are assigned respectively to the vertices of each polygon during dust cloud calculation. The greater the number of these parameters and the number of polygons representing the resolution in the vertical direction and time in the horizontal direction, the more accurate the simulation of a dust cloud becomes. Since processing is implemented whereby the set of polygons in the dust cloud changes shape during display in response to various factors, linking information for mutually linking the vertices of each polygon in the lattice is used as image data. This is determined such that the shape of the dust cloud as a whole changes.

A case where a dust cloud is thrown up from the front wheel of a vehicle is now supposed. Firstly, the position of the ground-contacting surface of the front wheel and an initial speed derived from the rate of free revolution of the tyres from the road surface and a random number are assigned to each polygon of the polygon set belonging to the column lying in the direction of the resolution R at the position T=0 on the time axis (FIG. 12, step 2031). Thereupon, the position on the time axis is shifted to T=1, and a position and speed are set for each polygon in the column lying in the direction of the resolution R at T=1. Specifically, each of the polygons at position T=1 are determined by adding various dust cloud parameters to be obtained in the current frame display to the position and speed of each polygon in the T=0 position processed for the previous frame display (step 2032). Here, factors such as the direction and strength of the wind, acceleration due to gravity, air resistance, and the like, are used as the aforementioned parameters. These parameters can be derived when required from the operating information, current car speed, and the like. Thereby, the polygons in the second column T=1 can be supplied with a movement which reflects the movement of the polygons in the previous column during the previous processing step.

The calculations described above are repeated in a similar fashion from the 3rd column at T=2 up to the n+1th column at T=n (where, n=10, for example). In other words, each polygon at T=2 is assigned a position and speed obtained by adding dust cloud parameters to the position and speed of the polygons at T=1 in the preceding processing step. Moreover, each polygon at T=3 is assigned a position and speed obtained by adding dust cloud parameters to the position and speed of the polygons at T=2 in the preceding processing step. Calculation is repeated in this fashion until, finally, each polygon at T=n is assigned a position and speed obtained by adding dust cloud parameters to the position and speed of the polygons at T=n−1 in the preceding processing step.

The positions of the vertices of each polygon set by means of this sequence of calculations are reconstituted to form an object representing a dust cloud by means of linking data linking vertices together (step 2033). Thereby, the object reverts to a single shape, the vertices of which move about like a dust cloud when it is displayed.

Moreover, the polygon set converted in the aforementioned manner is further subjected to various processing in order to adjust the appearance of the dust cloud (step 2034). This processing includes: (1) processing for increasing transparency as the polygons move along the time axis T; (2) processing for increasing transparency in an upward direction, in such a manner that the border between the uppermost polygons and the background does not stand out when the dust cloud as a whole is observed from a sideways direction; (3) processing for applying a fog of the same colour as the dust and causing the density of this fog to increase towards the centre of the dust cloud, in cases where the camera viewpoint has entered into the dust cloud atmosphere, in order to prevent alien effects in such cases; and the like.

Figure 14:
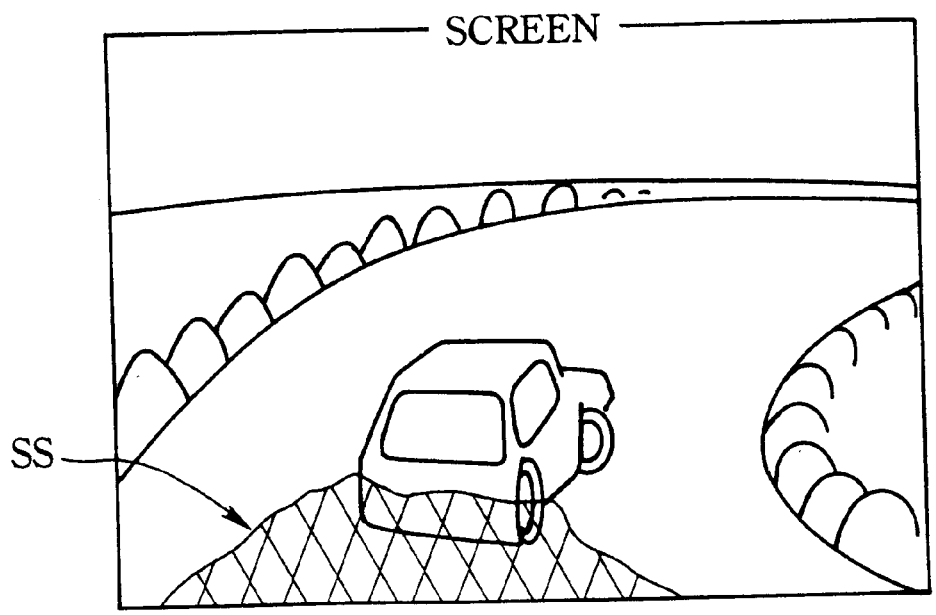
FIG. 14 is a diagram for illustrating processing for generating a dust cloud.
Figure 15:
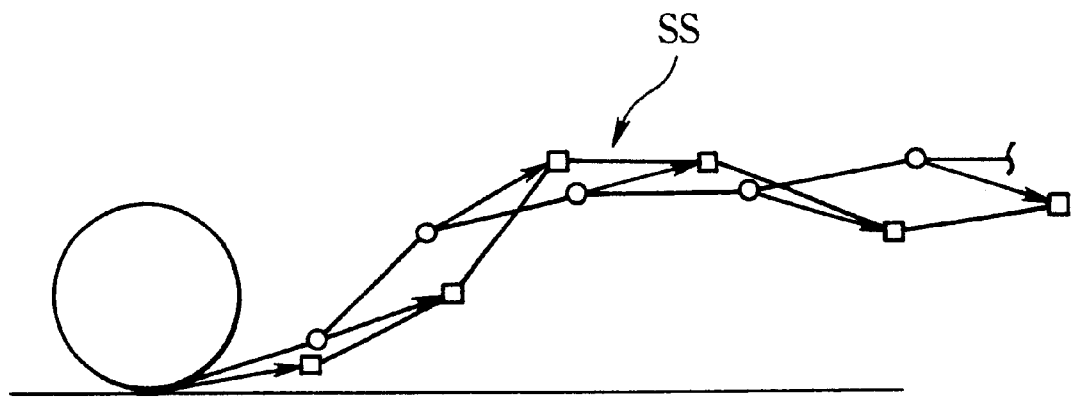
FIG. 15 is a diagram for illustrating processing for generating a dust cloud.

Thus, in the present embodiment, a dust cloud is represented by a set of polygons, and a dust cloud is displayed by setting the vertices of each polygon by physical calculation and causing the set of polygons to leave a trail behind them. In particular, as the physical calculation, the movement of the previous column of polygons during the previous processing cycle is reflected in the subsequent column of polygons, and moreover, dust cloud parameter values, principally, environmental factors, such as wind direction and strength, acceleration due to gravity, air resistance, and the like, are also applied. Therefore, as illustrated in FIG. 14 and FIG. 15, a dust cloud SS is displayed leaving a trail behind the vehicle and broadening as it moves towards the viewer, and its shape changes freely according to the various dust cloud parameter values. Since the movement of the vertices is determined by means of physical calculation, the behaviour (lifting, billowing) of the dust cloud as a whole appears much more natural than in a conventional device, and hence it is possible virtually to eliminate the alien effect created by an artificial depiction of a dust cloud.

The dust cloud as a whole also increases in transparency in an upward direction and a rearward direction. In other words, the particle density of the dust cloud is displayed such that it reduces in either of these directions, and hence the outline of the dust cloud is displayed in a blurred manner. Thus, it is possible to eliminate the unnatural impression created by conventional devices where the border between a dust cloud and the surrounding environment is too distinct. By this means also, the realism achieved in depicting a dust cloud is improved markedly.

Figure 16:
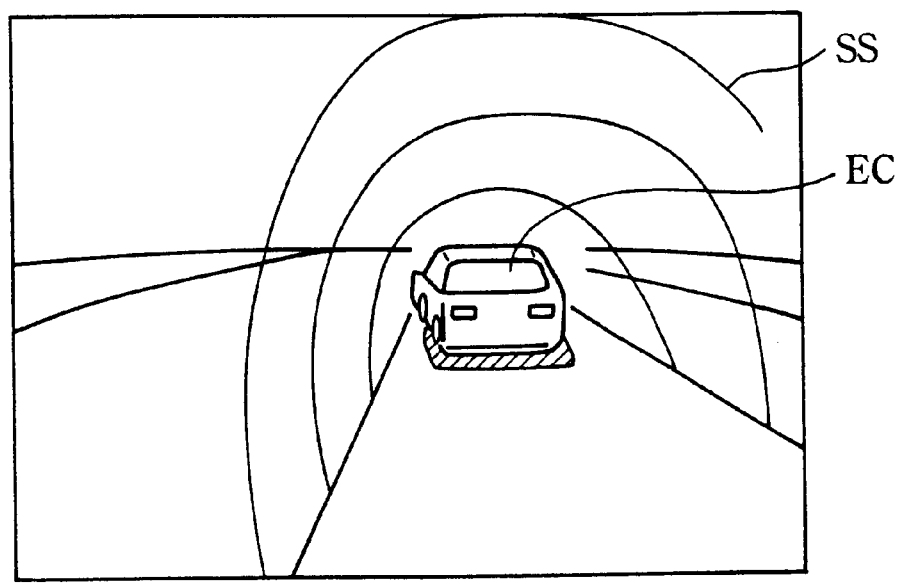
FIG. 16 is a diagram for illustrating processing for generating a dust cloud.

Moreover, in cases where the player's car is overtaken by an accelerating rival car EC, as illustrated in FIG. 16, the camera viewpoint located at the player's position in the player's own car may enter completely into the atmosphere of the dust cloud thrown up by the rival car. In situations such as this, according to conventional methods, it has only been possible to display a screen creating an optical illusion as though the player has entered into a tunnel of dust which is empty in the middle. However, in the present embodiment, a fog of the same colour as a dust cloud is applied, screens being displayed wherein the density of the fog increases towards the centre of the dust cloud, and therefore it is possible to represent a real state where the centre portion of the dust cloud is filled in. The alien effect created by conventional methods can be eliminated, extremely realistic dust clouds can be depicted, and hence the realism of the game can be improved. Moreover, by means of this fog processing, it is possible to make use of screen clipping (processing whereby an object is not displayed when it has moved beyond a certain distance to the front of the screen), and unnatural effects in the display can be avoided, whilst the amount of computational processing can be reduced.

Moreover, in the case of a four-wheel-drive vehicle, a dust cloud is generated from all four wheels, but when the car is travelling forwards, the polygons of the dust clouds generated by the rear wheels become mixed in with those generated by the front wheels, and hence generation of these dust cloud polygons can be omitted. When the car is reversing, on the other hand, it is possible to omit the dust cloud polygons generated by the front wheels.

Figure 17:
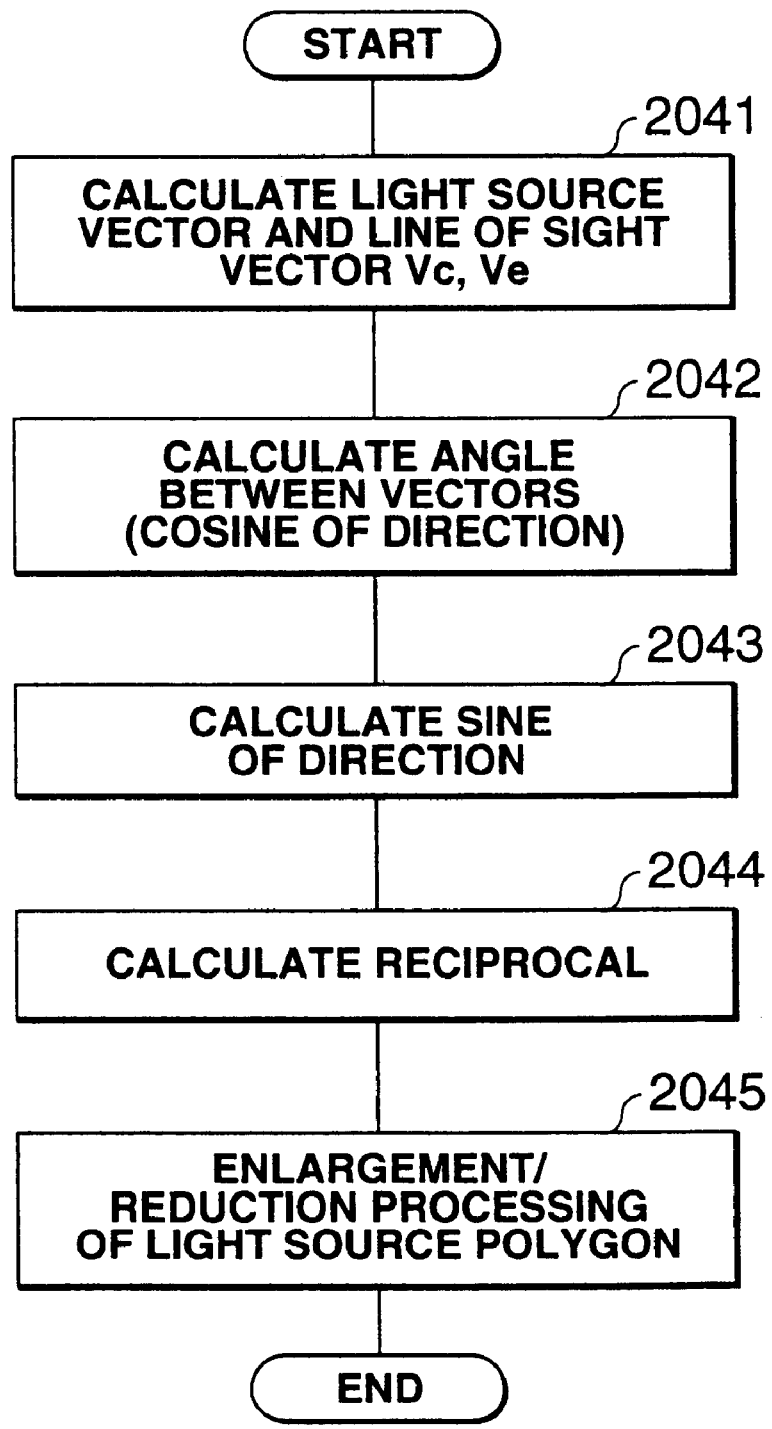
FIG. 17 is a diagram for illustrating a summary procedure for processing for representing dispersed light.

Next, processing for displaying dispersed light according to step 205 in FIG. 2 is described. Following on from the dust cloud generation processing, the CPU 101 conveys a sense of realism in the display screen by carrying out processing for depicting dispersed light, as one type of special effects processing for a car race game. This processing is now described on the basis of FIGS. 17–21. FIG. 17 shows a summary of the processing sequence involved.

Figure 18:
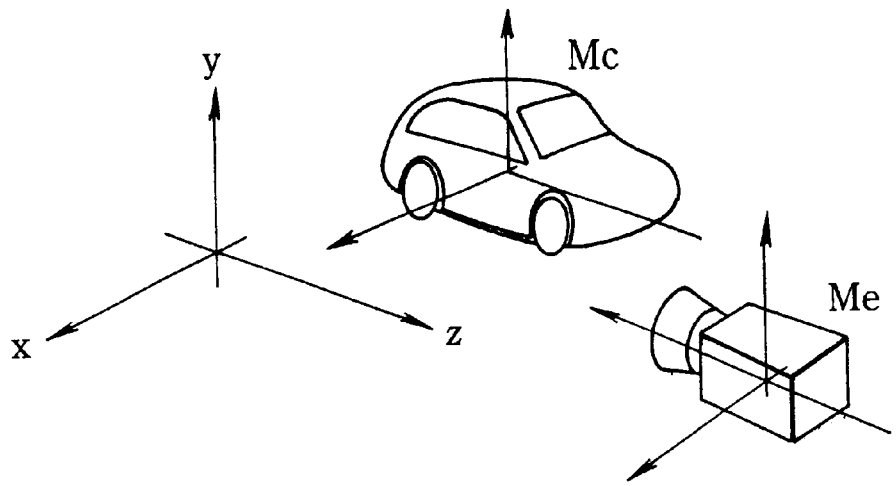
FIG. 18 is a diagram for illustrating processing for representing dispersed light.

FIG. 18 shows the positional relationship between the vehicle and the camera viewpoint in a three-dimensional virtual space.

A matrix indicating the spatial position of the vehicle is taken as Mc, and a matrix indicating the spatial position of the camera viewpoint is taken as Me. These matrices are represented as follows:

$$Mc = \begin{vmatrix} mc00 & mc01 & mc02 \\ mc10 & mc11 & mc12 \\ mc20 & mc21 & mc22 \\ mc30 & mc31 & mc32 \end{vmatrix}$$

$$Me = \begin{vmatrix} me00 & me01 & me02 \\ me10 & me11 & me12 \\ me20 & me21 & me22 \\ me30 & me31 & me32 \end{vmatrix}$$

Figure 19A:
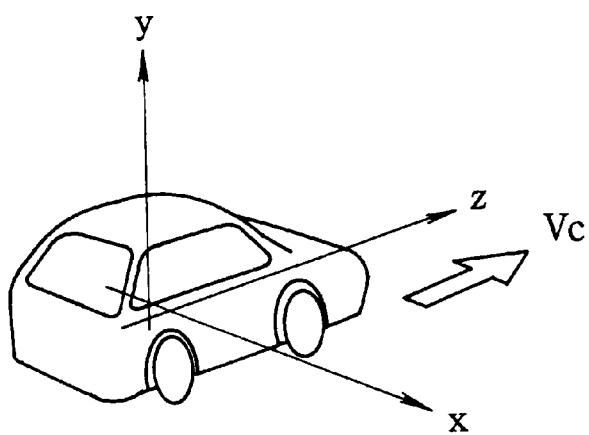
FIG. 19 is a diagram for illustrating processing for representing dispersed light.
Figure 19B:
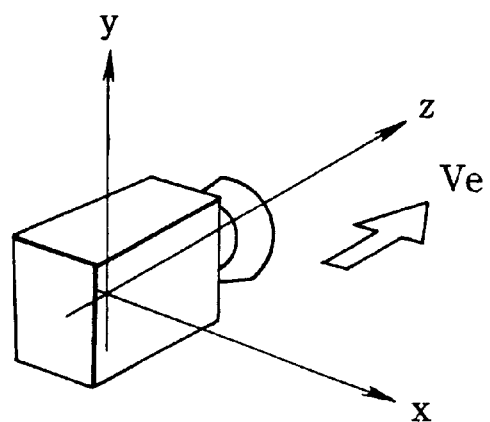
Figure 20:
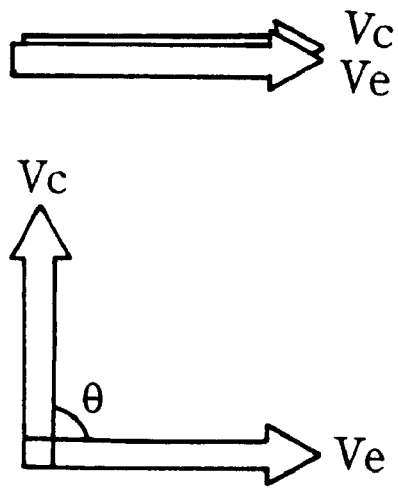
FIG. 20 is a diagram for illustrating processing for representing dispersed light.

Firstly, as illustrated by the examples in FIGS. 19(*a*) and (*b*), respective directional vectors Vc, Ve for the vehicle (orientation of light source) and camera viewpoint are determined (FIG. 17; step 2041). These directional vectors are quantities indicating which direction the vehicle (orientation of light source to be displayed) and the camera viewpoint are facing in within the game space, and they can be derived by multiplying the directional components in the respective matrices Mc, Me by (0,0,1), namely, $$Vc = (001) \begin{vmatrix} mc00 & mc01 & mc02 \\ mc10 & mc11 & mc12 \\ mc20 & mc21 & mc22 \end{vmatrix}$$

$$= (mc00, mc10, mc20)$$

$$Ve = (001) \begin{vmatrix} me00 & me01 & me02 \\ me10 & me11 & me12 \\ me20 & me21 & me22 \end{vmatrix}$$

$$= (me00, me10, me20)$$

Thereupon, the angle between these two directional vectors is determined (step 2042). Specifically, this angle can be derived by calculating the inner product of the two vectors and determining the cosine of this direction.

In other words, the cosine of this direction is derived as follows:

$$\cos\theta = (Vc \cdot Ve) \div (|Vc| \times |Ve|)$$

$$= (mc00 me00 + mc10 me10 + mc20 me20) \div$$

$$[(mc00^2 + mc10^2 + mc20^2)^{1/2} \times$$

$$(mc00^2 + mc10^2 + mc20^2)^{1/2}].$$

From these results, the sine of this angle is derived by:

$$\sin\theta = (1-\cos^2\theta)^{1/2}$$

(step 2043).

Thereupon, the reciprocal thereof, 1/sinθ is determined (step 2044). This function 1/sinθ forms a curve which expands to infinity when the two directional vectors Vc, Ve are mutually parallel (see FIG. 20). The function serves as an enlargement coefficient relating to a dispersed light display object, as described hereinafter.

Thereupon, a single light source polygon PGL (desirably, one polygon is used per light source) is located at a light source position, such as a headlight of the vehicle, or the like, and processing is implemented whereby this light source polygon is enlarged by the function 1/sinθ in the direction of the plane intersecting orthogonally with -the line of sight (step 2045).

Since the light source polygon is not always perpendicular with respect to the line of sight vector, the angle formed between the light polygon and the light source polygon (directional vector of the vehicle) is calculated in the aforementioned enlargement processing, and the light polygon is enlarged and caused to change shape in an elliptical shape according to this angle (in a three-dimensional virtual space, the X axis direction or Y-axis direction is enlarged in an elliptical shape). If the light source polygon is perpendicular with respect to the line of sight vector (in other words, if the light source polygon is facing directly towards the line of sight vector,) then processing for enlarging the light source polygon in a circular shape is carried out. The light source polygon is mapped such that it changes from transparent at the edges thereof to an opaque light source colour towards the centre thereof.

Thereby, as the angle between the camera viewpoint and the vehicle (orientation of light source) approaches parallelism, the state of light emission spreading from the light source changes at an increasing rate from an elliptical shape to an infinitely large circular shape, as depicted in FIGS. 21(*b*) and (*c*). Moreover, since the source of light emission located at the centre of the spreading light is opaque, it can be represented as being the brightest point. FIG. 21(a) shows an initial state in computational processing relating to a light source as described above, and in this state, the shape of the light source is a circle or ellipse of small diameter.

Therefore, it is possible to convey reliably to the player watching the screen (the observer position at the imaginary camera viewpoint) an impression of the directionality of the dispersed light, and since this impression is very similar to that experienced ordinarily in relation to real cars, it contributes reliably to improving the sense of realism conveyed by the vehicle behaviour. The change in the shape of the light source is not limited to that described here, and it is also possible to adopt a variety of other shapes, such as star shapes, or the like.

In particular, since dispersed light is represented as becoming larger than the display screen when the state of light emission is such that the camera viewpoint coincides with the direction of the vehicle, this creates a large impression on the player, thereby increasing the player's interest in the game and providing an image which can be grasped in an instinctive manner.

Moreover, this processing for representing dispersed light marks a departure from conventional methods, and although it creates a very significant visual impact, the processing calculation method is based on processing for enlarging a single polygon, and therefore it is very simple. Consequently, this method is characterized in that the computational load involved is only small and processing speed is fast.

The processing for representing dispersed light is not limited to the headlights of the vehicle, and indeed it may be applied to the tail lamps, or both headlights and tail lamps thereof.

Moreover, this processing for representing dispersed light may be applied satisfactorily in cases where, for example, the dispersed state of sunlight reflected from the glass surface of a fighter plane cockpit in a fighter plane game is represented.

The present invention is not limited to implementation in a game device forming an image generating device performing a car racing game. It may be implemented satisfactorily in a game device which causes an object representing a moving body to move along a path of travel set in a virtual three-dimensional space, for example, a boat race on water, a skateboard game, or the like.

Moreover, the invention may also be applied to water spray, in addition to dust clouds. It may also be applied to smoke. In brief, it may be applied to the display of any item emanating from a moving object which portrays the results of this movement.

For the storage medium in the present invention, it is also possible to include other storage means, for example, commonly known storage media, such as a hard disk, cartridge-type ROM, CD-ROM, or the like, or a communications medium (the Internet, personal computer communications networks, or information located on the servers in these networks, etc.)

Industrial Applicability

As described above, according to the present invention, it is possible to provide an image generating device and image generating method whereby factors relating to interference between a vehicle forming a moving body and the surrounding environment thereof can be represented more realistically, hence increasing the sense of realism in games based on the main theme of a moving vehicle, and also raising the interest created thereby, without markedly increasing the computational load or data volume involved.

In particular, it is possible to achieve markedly improved realism and authenticity in the representation of vehicle behaviour compared to the prior art, by implementing more natural impact judgement processing which creates few alien effects by preventing sudden changes in the judgement direction in the case of impact judgement processing when a vehicle crosses the join between two polygons, and by implementing impact judgement processing which takes indentations in the road surface into consideration.

Moreover, it is also possible to eliminate the alien effect created by conventional smooth or artificial-looking dust clouds by depicting the sensation of particles making up a dust cloud, and furthermore, dust clouds can be represented without creating alien effects in the state of the cloud as viewed from the camera viewpoint, even in cases where the camera viewpoint is located spatially inside a dust cloud.

Furthermore, images of dispersed light having an orientation, such as headlights, tail lights, or reflected light, emitted from a moving vehicle, cab be generated in a dynamic fashion, and hence dispersed light can be represented in a more realistic manner.

What is claimed is:

1. An image generating device comprising:
   impact establishing means for establishing the state of impact between an object and a path of travel specified by polygons in a virtual three-dimensional space; and
   generating means for generating image data representing a state where said object moves along said path of travel whilst maintaining the aforementioned state of impact;
   wherein said impact establishing means comprises:
     interpolating means for determining impact establishing data at an impact position of said object by interpolation from vertex data assigned to the vertices of the polygons of said path of travel; and
     impact specifying means for specifying the impact of said object on said path of travel in accordance with the impact establishing data interpolated by said interpolating means, and
     wherein said vertex data comprises a height and a normal vector of each vertex, and said impact establishing data comprises a height and a normal vector of said impact position.

2. The image generating device according to claim 1, wherein said interpolating means comprises:
   means for specifying respectively two edges of said polygon intersecting a line extending from said impact position and in parallel with a co-ordinate axis;
   means for setting a first and a second ridgeline on the basis of the vertex data for each end of said edges;
   means for determining respective data for intersection points of said ridgelines of said two edges;
   means for specifying a third ridgeline of a segment having ends at the intersection points of said two edges; and
   means for determining said impact establishing data at said impact position from the respective data for said intersection points on the third ridgeline.

3. The image generating device according to claim 2, wherein the first to third ridgelines are given as tertiary equations.

4. An image generating device comprising:
   impact establishing means for establishing the state of impact between an object and a path of travel specified by polygons in a virtual three-dimensional space; and image data generating means for generating image data representing a state where said object moves along said path of travel whilst maintaining the aforementioned state of impact;
wherein said impact establishing means comprises:
correcting means for correcting the impact establishing data at the impact position of said object in accordance with the attributes of said path of travel represented by said polygons; and
impact specifying means for specifying the impact of said object on said path of travel in accordance with said impact establishing data corrected by said correcting means, and
wherein said attributes of said path of travel are indentations in the path of travel, and light and shade data supplied as texture for attaching to said polygons are used as information for said indentations.

5. An image generating device comprising:
impact establishing means for establishing the state of impact between an object and a path of travel specified by polygons in a virtual three-dimensional space; and
data generating means for generating image data representing a state where said object moves along said path of travel whilst maintaining the aforementioned state of impact;
wherein said impact establishing means comprises:
interpolating means for determining impact establishing data at an impact position of said object by interpolation from vertex data assigned to the vertices of the polygons of said path of travel;
correcting means for correcting the impact establishing data interpolated by said interpolating means in accordance with the attributes of said path of travel represented by said polygons; and
specifying means for specifying the impact of said object on said path of travel in accordance with said impact establishing data corrected by said correcting means,
wherein said vertex data comprises a height and a normal vector of each vertex, and said impact establishing data comprises a height and a normal vector of said impact position, and
wherein said attributes of said path of travel are indentations in the path of travel, and light and shade data supplied as texture for attaching to said polygons are used as information for said indentations.

6. An image generating device comprising:
dispersed light controlling means for controlling image data for dispersed light emitted from a light source on an object moving in a virtual three-dimensional space, in accordance with the state of movement of said object; and
generating means for generating image data representing the state of movement of said object including this controlled image data for dispersed light,
wherein said dispersed light controlling means comprises means for determining a light source vector representing the orientation of said light source and a line of sight vector representing the orientation of a camera viewpoint in said virtual three-dimensional space; means for specifying at the least a single polygon as image data for said dispersed light; and changing means for changing the size of said polygon on the basis of information relating to the angle between said two vectors.

7. The image generating device according to claim 6, wherein said changing means is means for changing the size of said polygon by multiplying by a coefficient which expands to infinity when the orientations of said two vectors coincide with each other.

8. An image generating device comprising:
dust cloud controlling means for controlling image data for a dust cloud generated by an object moving in a virtual three-dimensional space, in accordance with a state of movement of said object; and
generating means for generating image data representing the state of movement of said object including this controlled dust cloud image data,
wherein said dust cloud controlling means comprises means for specifying said dust cloud image data as a plurality of polygons; means for determining the degrees of physical influence exerted by factors including the behaviour of said object; means for calculating the respective behaviour of said plurality of polygons in accordance with these degrees of influence; and means for linking said plurality of polygons together and reconstituting same as a polygon group in accordance with these calculation results.

9. The image generating device according to claim 8, wherein said dust cloud controlling means comprises means for applying processing to said reconstituted polygon group for imparting changes in transparency and a mist-like shape associated with the appearance of a dust cloud.

10. The image generating device according to any of claims 1, 4, 5, 6, 7, 8, or 9, wherein said object is a car in a car race game moving in said virtual three-dimensional space.

11. The image generating device according to either of claims 4 or 5, wherein said impact establishing data is a height and a normal vector of said impact position.

12. The image generating device according to claim 11, wherein said object is a car in a car race game moving in said virtual three-dimensional space.

13. An image generating method, comprising:
establishing a state of impact between an object and a path of travel specified by polygons in a virtual three-dimensional space; and
generating image data representing a state where said object moves along said path of travel, while maintaining the state of impact,
wherein establishing the state of impact comprises:
determining impact establishing data at an impact position of said object by interpolation from vertex data assigned to vertices of polygons of said path of travel, and specifying the impact of said object on said path of travel in accordance with this impact establishing data, and
wherein said vertex data comprises a height and a normal vector of each vertex, and said impact establishing data comprises a height and a normal vector of said impact position.

14. An image generating method, comprising:
establishing a state of impact between an object and a path of travel specified by polygons in a virtual three-dimensional space; and
generating image data representing a state where said object moves along said path of travel, while maintaining the state of impact,
wherein establishing the state of impact comprises:
correcting impact establishing data at an impact position of said object in accordance with attributes of said path of travel represented by said polygons, and
specifying the impact of said object on said path of travel in accordance with this corrected impact establishing data, and wherein said attributes of said path of travel are indentations in the path of travel, and light and shade data supplied as texture for attaching to said polygons are used as information for said indentations.

15. An image generating method, comprising:

controlling image data for dispersed light emitted from a light source on an object moving in a virtual three-dimensional space, in accordance with a state of movement of said object; and generating image data representing the state of movement of said object including the controlled image data for said dispersed light, wherein controlling the image data for the dispersed light comprises determining a light source vector representing an orientation of said light source and a line of sight vector representing an orientation of a camera viewpoint in said virtual three-dimensional space, specifying at the least a single polygon as the image data for said dispersed light, and changing a size of said polygon on the basis of information relating to an angle between said two vectors.

16. An image generating method, comprising:

controlling image data for a dust cloud generated by an object moving in a virtual three-dimensional space in accordance with a state of movement of said object; and generating image data representing the state of movement of said object including the controlled dust cloud image data, wherein controlling the image data for the dust cloud comprises specifying said dust cloud image data as a plurality of polygons, determining degrees of physical influence exerted by factors including a behaviour of said object, calculating respective behaviour of said plurality of polygons in accordance with the degrees of physical influence, and linking said plurality of polygons together and reconstituting same as a polygon group in accordance with the calculation results.

17. A computer-readable medium containing instructions to implement an image generating method, the method comprising:

establishing a state of impact between an object and a path of travel specified by polygons in a virtual three-dimensional space; and generating image data representing a state where said object moves along said path of travel, while maintaining the state of impact, wherein establishing the state of impact comprises determining impact establishing data at an impact position of said object by interpolation from vertex data assigned to vertices of polygons of said path of travel, and specifying the impact of said object on said path of travel in accordance with this impact establishing data, and wherein said vertex data comprises a height and a normal vector of each vertex, and said impact establishing data comprises a height and a normal vector of said impact position.

18. A computer-readable medium containing instructions to implement an image generating method, the method comprising:

establishing a state of impact between an object and a path of travel specified by polygons in a virtual three-dimensional space; and generating image data representing a state where said object moves along said path of travel, while maintaining the state of impact, wherein establishing the state of impact comprises:
correcting impact establishing data at an impact position of said object in accordance with attributes of said path of travel represented by said polygons, and
specifying the impact of said object on said path of travel in accordance with this corrected impact establishing data, and
wherein said attributes of said path of travel are indentations in the path of travel, and light and shade data supplied as texture for attaching to said polygons are used as information for said indentations.

19. A computer-readable medium containing instructions to implement an image generating method, the method comprising:

controlling image data for dispersed light emitted from a light source on an object moving in a virtual three-dimensional space, in accordance with a state of movement of said object; and generating image data representing the state of movement of said object including the controlled image data for said dispersed light, wherein controlling the image data for the dispersed light comprises determining a light source vector representing an orientation of said light source and a line of sight vector representing an orientation of a camera viewpoint in said virtual three-dimensional space, specifying at the least a single polygon as the image data for said dispersed light, and changing a size of said polygon on the basis of information relating to an angle between said two vectors.

20. A computer-readable medium containing instructions to implement an image generating method, the method comprising:

controlling image data for a dust cloud generated by an object moving in a virtual three-dimensional space in accordance with a state of movement of said object; and generating image data representing the state of movement of said object including the controlled dust cloud image data, wherein controlling the image data for the dust cloud comprises specifying said dust cloud image data as a plurality of polygons, determining degrees of physical influence exerted by factors including a behaviour of said object, calculating respective behaviour of said plurality of polygons in accordance with the degrees of physical influence, and linking said plurality of polygons together and reconstituting same as a polygon group in accordance with the calculation results.

21. The image generating device according to claim 2, wherein said object is a car in a car race game moving in said virtual three-dimensional space.

22. The image generating device according to claim 3, wherein said object is a car in a car race game moving in said virtual three-dimensional space.

* * * * *

UNITED STATES PATENT AND TRADEMARK OFFICE
CERTIFICATE OF CORRECTION

PATENT NO. : 6,657,630 B1
DATED : December 2, 2003
INVENTOR(S) : Masahito Kurosawa et al.

It is certified that error appears in the above-identified patent and that said Letters Patent is hereby corrected as shown below:

Column 19,
Line 22, "data generating" should read -- image data generating --.

Signed and Sealed this

Tenth Day of August, 2004

JON W. DUDAS
*Acting Director of the United States Patent and Trademark Office*